INVENTOR.
KENNETH M. GAVER
ESTHER P. LASURE
LEVI M. THOMAS
BY Jerome R. Cox
THEIR ATTORNEY INVENTOR.
KENNETH M. GAVER
ESTHER P. LASURE
LEVI M. THOMAS
BY Jerome R. Cox
THEIR ATTORNEY Dec. 9, 1952 K. M. GAVER ET AL 2,621,174
AMINO DERIVATIVES OF GLUCOPYRANOSE POLYMERS
Original Filed May 9, 1947 3 Sheets-Sheet 3

INVENTOR.
KENNETH M. GAVER
ESTHER P. LASURE
LEVI M. THOMAS
BY Jerome R. Cox
THEIR ATTORNEY Patented Dec. 9, 1952

2,621,174

UNITED STATES PATENT OFFICE 2,621,174

AMINO DERIVATIVES OF GLUCOPYRANOSE POLYMERS

Kenneth M. Gaver, Columbus, Esther P. Lasure, Grove City, and Levi M. Thomas, Columbus, Ohio, assignors to The Keever Starch Company, Columbus, Ohio, a corporation of Ohio Original application May 9, 1947, Serial No. 747,108. Divided and this application June 16, 1950, Serial No. 168,594

11 Claims. (Cl. 260—211)

This application is a division of our copending application Serial No. 747,108, filed May 9, 1947, now Patent No. 2,538,903.

The inventions disclosed in this application relate to new compositions of matter or compounds and to new processes for the formation of such new compounds. The processes described herein illustrating our inventions are especially designed to produce new products from carbohydrates such as starch.

The process invented by us comprises in general the reaction of an amidogen compound with a starch or some other suitable carbohydrate in a nonaqueous system at a temperature of 81° C. and higher. As used in this specification and claims we define "amidogen compounds" to mean compounds having the radical $NH_2$ which is known only in combination in amines, amides and their derivatives. The amidogen compound may thus be an amide, an amine or a compound containing either one or more amide or amine groups. In carrying out the process of the reaction of an amidogen compound with a carbohydrate, we produce many new compounds which we have discovered and synthesized by our process.

For example, in carrying out certain preferred embodiments of our processes we produce certain specific new products which we have discovered and synthesized by our processes, these products being in the nature of amido carbohydrate esters which we have designated by the coined word "carbohydramate"; amido starches which we have designated by the coined word "starchamate"; amino carbohydrate derivatives which we have designated by the coined word "carbohydramine"; and amino starch derivatives which we have designated by the coined word "starchamine." We define these words as follows for the purposes of their use in this specifiation and in the claims hereof: "Carbohydramate" means a compound having an amido-containing group substituted for one of the hydrogen atoms of each of one or more of the several hydroxyl groups of the carbohydrate molecules so as to form an amido ester. The word "starchamate" means a compound composed of an undetermined number of polymerized glucopyranose units wherein one or more amido-containing groups or radicals are substituted for the hydrogen atoms of one or more of each of the several hydroxyl groups of the starch unit so as to form a polymerized compound which in fact is an amido starch ester. "Carbohydramine" means a compound having an amino-containing group substituted for one of the hydrogen atoms of each of one or more of the several hydroxyl groups of the carbohydrate molecules so as to form an amino derivative. The word "starchamine" means a compound composed of an undetermined number of polymerized glucopyranose units wherein one or more amino-containing groups or radicals are substituted for the hydrogen atoms of one or more of each of the several hydroxyl groups of the starch unit so as to form a polymerized compound which is in fact a starch derivative.

Prior to our inventions disclosed herein, as is disclosed in a patent application of Kenneth M. Gaver, Esther P. Lasure and Derk V. Tieszen Serial No. 357,995, now abandoned, and in the continuation thereof Serial No. 707,318, now Patent No. 2,518,135, methods of forming monosodium starchates and other monoalkali starchates and monometallic and monoorganic derivatives thereof and the products of such methods were known. Also, by the use of prior art methods, mono and polysubstituted products of cellulose and of simple sugars have been prepared as is described, for example, in Scherer and Hussey, Journal of American Chemical Society, 53: 2344; 1931; Schorigin et al., Berichte 69; 1713 (1936); Peterson and Barry, U. S. Patent 2,157,083 (1939); Muskat, Journal of American Chemical Society, 56:693 (1934); and Muskat, Journal of American Chemical Society, 56:2449 (1934).

However, when we attempted to substitute amino and amido radicals in a manner similar to that in which alkali metal radicals were substituted (that is, by the reaction of starches and other carbohydrates with simple ammonium hydroxide) and by the reaction of ammonia directly, or in a manner suggested by the prior art literature listed above, such attempted substitutions were found to be impossible.

One of the objects of our invention is the provision of new and useful processes of forming new and useful carbohydrates.

A further object of our invention is the provision of new and useful processes for forming amino carbohydrate derivatives and amido carbohydrate esters.

A further object of our invention is the provision of new and useful processes of forming various new products from starch.

A further object of our invention is the provision of new and useful processes for forming various amino and amido starches.

A further object of our invention is the provision of new and useful amino and amido carbohydrate products.

A further object of our invention is the formation of new and useful amino and amido starches.

A further object of our invention is new processes of forming certain known carbohydrate esters by the reaction of carbohydrates with amidogen compounds.

Further objects and features of our invention will be apparent from a reading of the subjoined specification and claims when considered in connection with the accompanying drawings showing processes illustrating certain embodiments of our invention.

Figure 1:
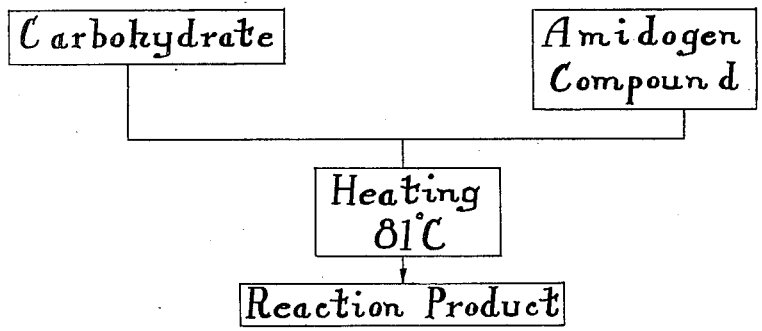
Fig. 1 is a diagram illustrating a process of forming a reaction product from a carbohydrate and an organic amidogen compound.

As stated above, we found that it was impossible to react simple ammonium hydroxide with starch in a manner similar to that which sodium and potassium hydroxide reacted or to react ammonia directly with starch. Moreover, we found that it was impossible to substitute an amino or amido radical in an alkali metal starchate in place of the sodium or potassium group and thus form amino or amido starches. The inventions disclosed herein are based upon the discovery that when a carbohydrate is reacted directly with an amine or an amide at a temperature of 81° C. or higher, with or without a solvent, with or without agitation, a reaction will occur which will go practically to completion provided there is sufficient reactant present for this to occur.

Such reaction products may be prepared using all sorts of starches, dextrins, dextran, cotton, linen, sugars, glucosides, jute, ramie, cellulose and inulin. All of the polyamyloses and other saccharides, natural, derived and synthetic, tested reacted similarly.

It has been found that any alcohol is suitable as solvent as is evidenced by the use of the following alcohols which we have found which may be used as solvents in preparing such carbohydrate esters and derivatives provided certain other variables are sufficiently controlled as will be discussed later.

Allyl
Iso-amyl
n-Amyl
Sec.-amyl
Anisyl
Benzhydrol
Benzoylcarbinol
Benzyl
2,3-butanediol
n-Butyl
Iso-butyl
Sec.-butyl
Tert.-butyl
Sec.-butyl carbinol
β-(p-Tert. butyl phenoxy) ethyl
Capryl
Ceryl
Cetyl
3-chloro-2-propenol-1
Cinnamic
Crotyl
Cyclohexanol
Decyl
Diacetone
Diethyl carbinol
Dimethyl benzyl carbinol
Dimethyl ethynyl carbinol
Dimethyl n-propyl carbinol
Dimethyl isopropyl carbinol
Di-n-propyl carbinol
Di-iso-propyl carbinol
Ethyl
2-ethyl butyl
2-ethyl hexanol
Furfuryl
n-Heptyl
n-Hexyl
Sec.-hexyl
Trimethylene glycol
Lauryl
Methallyl
Methyl
Methyl amyl
Methyl butyl carbinol
o-Methyl cyclohexanol
m-Methyl cyclohexanol
p-Methyl cyclohexanol
2-methyl pentanol-1
Methyl isopropyl carbinol
n-Nonyl
n-Octyl
Octanol-2
Phenyl-propyl
Tert.-amyl
n-Propyl
Iso-propyl
Tetrahydrofurfuryl
Triethyl carbinol
Triphenyl carbinol
Ethylene glycol
Ethylene glycol monomethyl ether
Ethylene glycol monoethyl ether
Ethylene glycol monobenzyl ether
Ethylene glycol monobutyl ether
Diethylene glycol
Diethylene glycol monomethyl ether
Glycerol
Glycerol α-n-butyl ether
Glycerol αγ-di-methyl ether
Glycerol-αγ-di-phenyl ether
Glycerol α-monomethyl ether
Hexamethylene glycol
2-methyl 2,4-pentanediol
Diethylene glycol monoethyl ether
Diethylene glycol monobenzyl ether
Diethylene glycol monobutyl ether
Di-propylene glycol
Propylene glycol
Triethylene glycol Substantially any organic solvent is suitable as is evidenced by the use of the following organic solvents which may also be used similarly:

| | |
|---|---|
| Sec.-amyl benzene | Iso-octane |
| Tert.-amyl benzene | n-Pentane |
| Benzene | Petroleum ether |
| n-Butyl benzene | Propyl benzene |
| Sec.-butyl benzene | Tetraisobutylene |
| Tert.-butyl benzene | Tetradecane |
| Cumene | Toluene |
| Cyclohexane | Triisobutylene |
| 2,7-dimethyl octane | Trimethyl butane |
| Ethyl cyclohexane | Trimethylethylene |
| Heptane | 2,2,4-trimethyl pentane |
| Hexane | Triphenyl methane |
| Hexadecane | o-Xylene |
| Ligroin | m-Xylene |
| Methyl cyclohexane | p-Xylene |
| Nonane | |
| n-Octane | and various others. |

Ketones may also be used similarly as is evidenced by the use of the following:

| | |
|---|---|
| Acetone | Methyl butyl |
| Acetophenone | o-Methyl cyclohexanone |
| Anisalacetone | m-Methyl cyclohexanone |
| Benzalacetone | p-Methyl cyclohexanone |
| Benzophenone | Methyl ethyl |
| Benzoylacetone | Methyl hexyl |
| Diethyl | Methyl n-propyl |
| Diisopropyl | Methyl iso-propyl |
| Ethyl phenyl | |
| Ethyl undecyl | and various others. |
| Methyl amyl | |

Ethers may also be used similarly as is evidenced by the use of the following:

| | |
|---|---|
| Allyl | Chloromethyl |
| Allyl ethyl | Dichloromethyl |
| n-Amyl | Diethylene glycol diethyl |
| Iso-amyl | Ethyl butyl |
| Anethole | Ethylene glycol dibenzyl |
| Anisole | Ethylene glycol diethyl |
| Benzyl | Ethyl |
| Benzylmethyl | Phenetole |
| n-Butyl benzyl | n-Hexyl |
| n-Butyl | n-Propyl |
| n-Butyl phenyl | Iso-propyl |
| 1,4-dioxane | |
| Di-n-propyl | and various others. |
| Benzyl ethyl | |

It is clear therefore that all non-aqueous solvents capable of dissolving the amine or amide to the extent necessary are satisfactory. However, attempts to condense the reactants in a water solution failed.

It must be understood, however, that all these solvents mentioned do not have the same utility in the process. However, any solvent which will dissolve the amine or amide used even in small amounts, is a suitable vehicle in which to carry out the reaction. As the reactants in solution condense they go out of solution leaving the solvent available for additional increments of the reactants.

As stated above the carbohydrates and the amidogen compounds will react either with or without a solvent but if a solvent is used, it must be non-aqueous. Therefore, generally the relation occurs in any non-aqueous system.

REACTANTS

Every amide tested reacted as desired. A partial list of reacting amides included:

| | |
|---|---|
| Urea | Guanidine |
| Thiourea | Cyanamide |
| Ethyl urea | Dicyandiamide |
| Butyl urea | Melamine |
| Ammeline | Ammelide |
| Amidines | Diphenyl guanidine |
| Guanylurea | Phenyl biguanidine |
| Hydrazides | Acetamide |
| Formamide | Oxalamide |

Long chain amides (i. e. stearamide, palmitamide, etc.) react only slightly with the long chain polysaccharides such as starch but react freely with carbohydrates of lower molecular weight such as the simple sugars. When the reacting amide contained two free amido groups, the reaction product had at least one free amido group. However, when the amide had only one amido group such as formamide, acetamide, benzamide, cyanamide, ammelide, etc. the reaction product was not an amido ester but, on the contrary, was a formate, an acetate, a benzoate, cyanate, etc. Also, nearly every primary amine tested reacted as desired; however, separate and distinct reactions occurred. In view of the above, we have separated the reactants into five groups.

Group I includes those amides having only one amido group. As the temperature rises to 81° C. a reaction occurs in which ammonia is evolved. The reaction product although not an amide is an ester of the carbohydrate reacted.

Group II includes those amides having one amido group and also having another amido or amido derived group. As the temperature rises to 81° C. a reaction occurs in which ammonia is evolved. The reaction product has at least one amido or amido derived group which is not attached directly to the carbohydrate.

Group III includes mainly those low boiling amines containing but one amino group and no other close functional group. This group of amines apparently add only. No ammonia is evolved.

Group IV includes mainly those higher boiling amines containing one and only one amino group and at least one other close functional group. This group of amines apparently adds first and as the temperature rises to 81° C., a reaction occurs in which ammonia is evolved. The reaction product contains no nitrogen and is not an ester.

Group V includes mainly those amines containing more than one amino group. This group of amines apparently add first and as the temperature rises to 81° C., a reaction occurs in which ammonia is evolved. The reaction product has an amino group.

A partial list of reactants includes:

*Group I*

| | |
|---|---|
| Formamide | Cyanamide |
| Acetamide | Ammelide |
| Benzamide | | and similarly acting materials.

*Group II*

| | |
|---|---|
| Melamine | Butyl urea |
| Diphenyl guanidine | Ammeline |
| Phenyl biguanidine | Amidines |
| Oxalamide | Guanylurea |
| Urea | Hydrazides |
| Thiourea | Guanidine |
| Ethyl urea | Dicyandiamide | and similarly acting materials.

Group III

Mono-ethyl amine     N-butyl amine
N-propyl amine and similarly reaction amines.

Group IV 2-amino-2-methyl-    2-amino-1-butanol
1,3-propanediol      4-amino-2-butanol and similarly acting materials.

Group V

Ethylene diamine         Phenylene diamine
Diethylene triamine      Propylene diamine
Tetraethylene pentamine  1,3-diamino butane
Triethylene tetramine and similarly reaction amines.

TEMPERATURE

A temperature of 80–81° C. appears to be critical. During the condensation of reactants containing two or more amido groups, as soon as the temperature reaches 80–81° C. the product suddenly agglomerates and settles out of the reaction mixture. Simultaneously with the agglomeration of the product ammonia is evolved, one mole of ammonia for each mole of reactant entering the carbohydrate unit or molecule. During the reaction of monoamides such as acetamide, benzamide, cyanamide, formamide, etc., ammonia is evolved at the same temperature but the product is an acetate, benzoate, cyanate, or formate, etc. and is not an amide.

During the reaction of monoamines, the temperature of 80–81° C. is also critical. Using temperatures up to 115° C. gives no evidence of the formation of any derivative other than mono.

PRESSURE

Since the reaction of the amides in all cases and of the amines of Groups IV and V involve the evolution of ammonia and since the ammonia has a greater volume than it had in combination in the reactant, the use of pressure in such reactions would interfere with the reaction itself and the use of pressure must be avoided. A vacuum can be utilized if desired to drive the reaction to completion. However, pressure is necessary with the lower boiling amines of Group III (e. g. ethylamine) so that the temperature requirements might be fulfilled.

AGITATION

In the reactions we are describing as soon as the reaction is initiated the reaction product settles from the reaction mixture as a rubber-like mass. Usually this mass is so heavy it stops the agitator. However, the reaction apparently proceeds uninterruptedly. In the case of reaction of amides without solvent the reaction mixture softens; ammonia is evolved and the mixture again hardens (cakes) and does not soften again in this temperature range. At the softened stage the product is very sticky; afterwards, however, it is not sticky but powdery. Better yields in a shorter reaction time could undoubtedly be obtained with efficient agitation but nothing, that we have as yet observed, indicates that agitation is necessary.

TIME

No exact definition of the time effect can be given. In repeated preparations we have been able to discern no differences between slow heating and rapid heating. Neither were we able to detect any differences between laboratory and pilot plant operations as far as time was concerned.

MECHANISM

Where starch and other carbohydrates are treated with an amine or amide at 81° C. and above, this reaction proceeds as according to the following equations in which R may be hydrogen or any organic radical and where R' is an active functional group as, for example, a hydroxyl or a nitrogen group:

1.
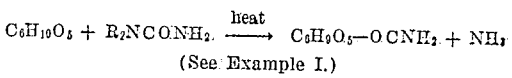
(See Example I.)

2.
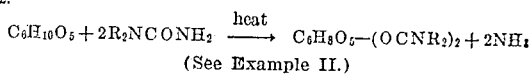
(See Example II.)

3.
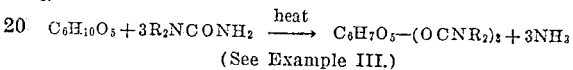
(See Example III.)

4.
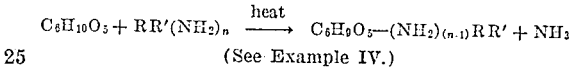
(See Example IV.)

5.
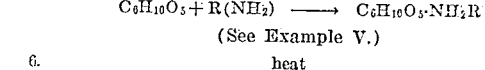
(See Example V.)

6.
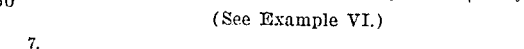
(See Example VI.)

7.
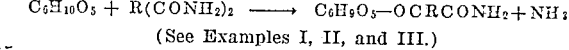
(See Examples I, II, and III.)

Figure 2:
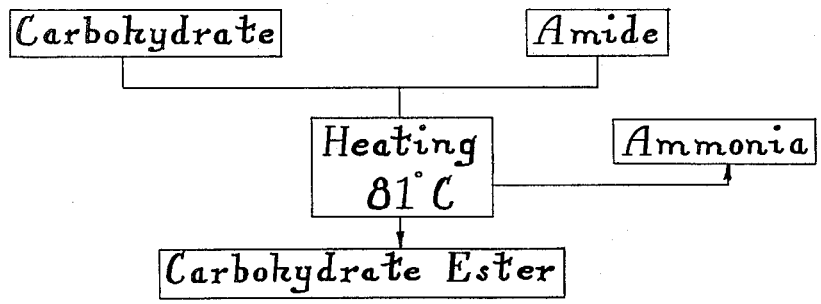
Fig. 2 is a similar diagram illustrating a process of forming a carbohydrate ester.
Figure 3:
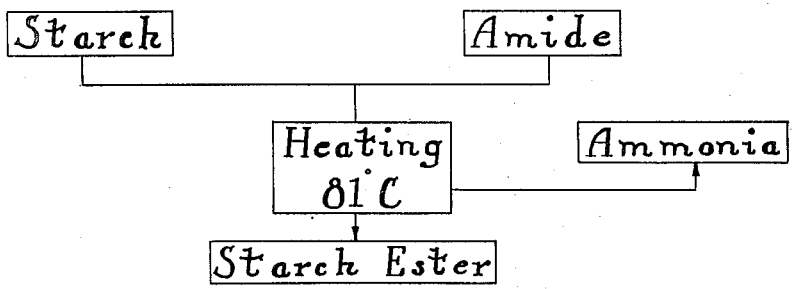
Fig. 3 is a similar diagram illustrating a process of forming a starch ester.
Figure 4:
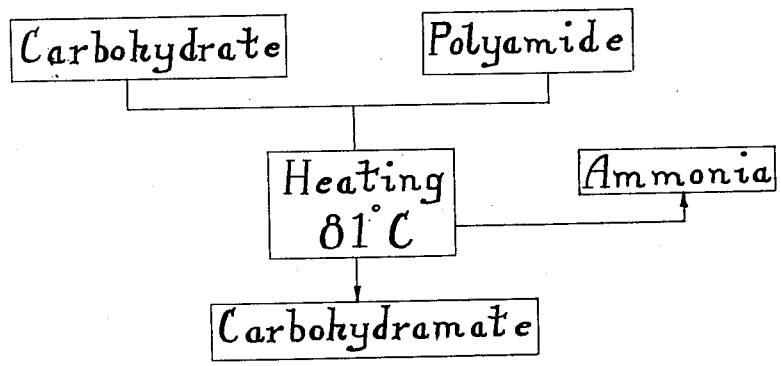
Fig. 4 is a similar diagram illustrating a process of forming a carbohydramate.
Figure 5:
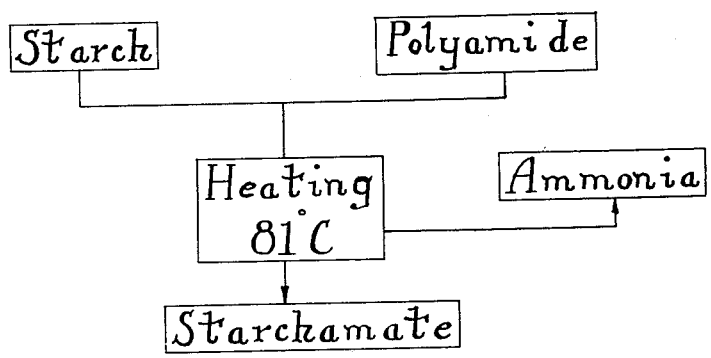
Fig. 5 is a similar diagram illustrating a process of forming a starchamate.
Figure 6:
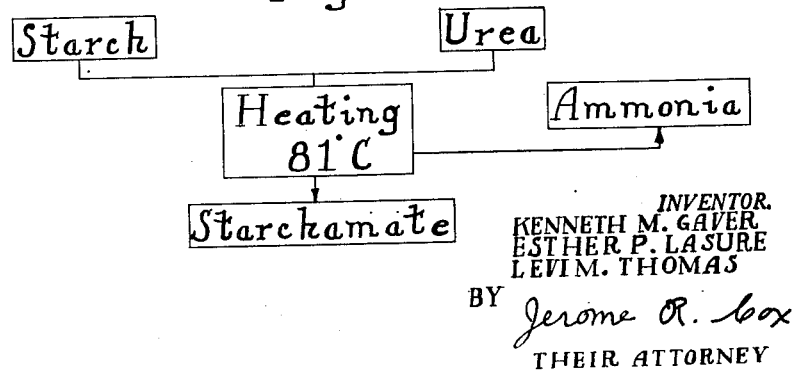
Fig. 6 is a similar diagram illustrating a process of forming an urea starchamate.
Figure 7:
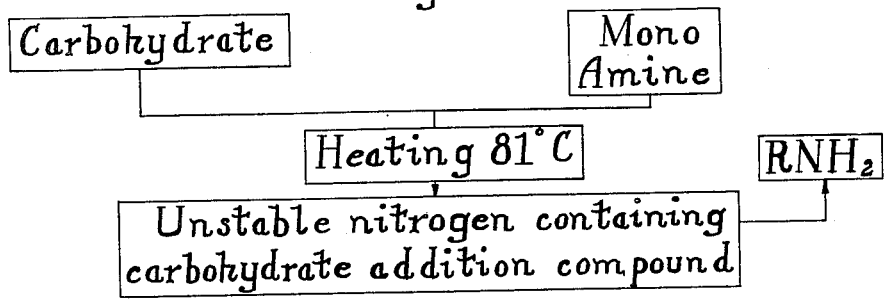
Fig. 7 is a similar diagram illustrating a process of forming an addition product by the reaction of a carbohydrate and a monoamine.
Figure 8:
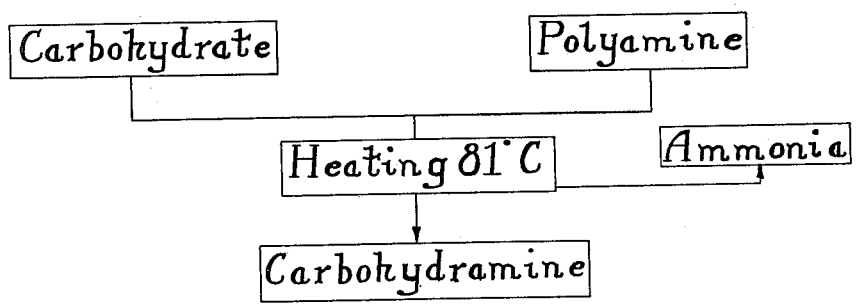
Fig. 8 is a similar diagram illustrating a process of forming a carbohydramine.
Figure 9:
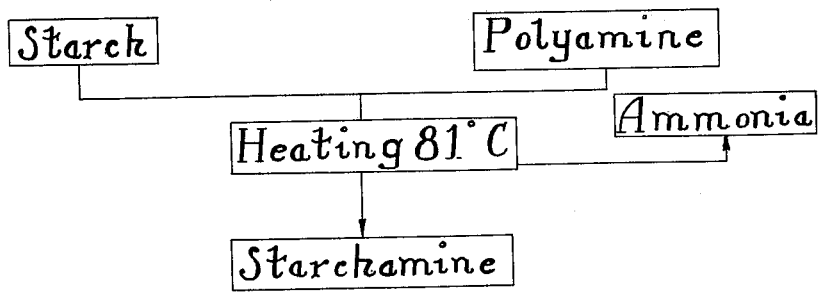
Fig. 9 is a similar diagram illustrating a process of forming a starchamine.

As illustrated in Fig. 1 a carbohydrate heated with an amidogen compound (an amide, amine) to a temperature of 81° C. gives a reaction product. If the amidogen compound is an amide, ammonia (Fig. 2) is evolved and a carbohydrate ester is formed. If starch is the carbohydrate and is heated with an amide (Fig. 3), ammonia is evolved and a starch ester is formed. If the reactant is a monoamide, there is no amidogen group in the product. If the amidogen compound is a polyamide as, for example, a diamide, either a carbohydramate (Fig. 4) or a starchamate (Fig. 5) is formed, ammonia being evolved in each case. It follows that if starch is similarly heated with urea (Fig. 6) a starchamate is formed with evolution of ammonia. If starch or other carbohydrate is heated with a polyamine (Figs. 8 and 9) a starchamine or carbohydramine is formed, with evolution of ammonia in each case.

If starch or other carbohydrate is heated with a monoamine, the reaction varies. In some cases, ammonia is evolved and the product contains no nitrogen. In other cases, no ammonia is evolved and the product is an addition product. This distinction may depend on the presence or absence of another close active functional group. If there is such other close active functional group, ammonia is usually evolved and the product contains no nitrogen. On the other hand usually where there is no other close active functional group, no ammonia is evolved and the product is an addition product.

The difference in the reaction may be on account of the lower boiling points of the reactants in Group III. As stated above where the boiling point is relatively low, pressure is necessary to prevent evaporation of the amine. Such pressure probably prevents the evolution of ammonia and prevents the substitution for the hydrogen of the hydroxyl group of the glucose units.

We believe that in the reactions described above, the amines form only monosubstitution products. On the other hand, the amides (where there is a sufficient quantity of the amide present as in Examples II and III) form di and tri amide e. g. urea starchamates. They form mono urea starchamate where only the proper stoichiometric quantity is present. We believe that the products of Examples I and III are respectively substantially pure mono and tri urea starchamates only but that possibly the product of Example II may in certain cases contain relatively small proportions of mono and tri urea starchamates as well as a large proportion of di urea starchamate.

EXAMPLES

*Example I*

(Illustration of Equations 1 and 7 above)

100 lbs. of corn starch
35 lbs. of urea
50 gallons of toluene

Heat with agitation and slow distillation until about 10 gallons of distillate have been collected. Filter on centrifuge, wash with toluene and dry in a rotary vacuum dryer at a temperature below 160° C. The dried product weighs 111 lbs. and contains 6.75% nitrogen (calculated 6.83%). Distillate contains ammonia.

*Example II*

(Illustration of Equation 2 above)

100 lbs. of rice starch
70 lbs. of urea
50 gallons of toluene

Heat with agitation and slow distillation until about 10 gallons of distillate have been collected. Filter on a centrifuge, wash with toluene and dry in a rotary vacuum dryer at a temperature below 150° C. The dried product weighs 150 lbs. and contains 11.5% nitrogen (calculated 11.3%). Distillate contains ammonia.

*Example III*

(Illustration of Equation 3 above)

100 grams of wheat starch
105 grams of urea (excess)
1000 ml. of toluene

Heat with agitation and slow distillation until 250 ml. distillate have been collected. Filter on suction, wash with toluene and then with ether and then air dry. Ammonia is evolved in this reaction. This product solvates at the reaction temperature but may easily be desolvated with ethyl ether. The air dried product weighs 177 grams and contains 14.1% nitrogen (calculated 14.4%).

*Example IV*

(Illustration of Equation 4 above)

50 grams of corn starch
50 grams of diethylene triamine
500 ml. toluene

Heat with agitation and slow distillation until 250 ml. distillate have been collected. Filter on suction, wash with toluene and then with ether and then air dry. Ammonia is evolved in this reaction. Air dry weight 69.4 grams and the product was very hygroscopic. At the end of the reaction period the reaction product existed as a rubber like mass. The distillate was very alkaline.

*Example V*

(Illustration of Equation 5 above)

16 grams of corn starch
50 ml. monoethyl amine

The starch is dissolved in the monoethyl amine and is heated without agitation and without distillation under pressure (175#) at a temperature of 100° C. for one hour. Cool, let the excess ethyl amine evaporate off. Weight of reaction product 21 grams. This product then slowly loses ethyl amine until the weight drops to that of the original starch.

*Example VI*

(Illustration of Equation 6 above)

50 grams of corn starch
35 grams of acetamide
500 ml. of toluene

Heat with agitation and slow distillation until about 250 ml. distillate have been collected. Filter on suction, wash with toluene and then with ether and then air dry. The air dried product weighs 75 grams. Saponification of the air dry product and its air dry weight indicated the formation of the monoacetate. Ammonia was evolved in the reaction.

*Example VII*

50 grams of sucrose
17.5 grams of urea
500 ml. of toluene

The materials were heated with agitation and slowly distilled until 250 ml. distillate have been collected. The reaction product separated as a sirupy mass at the bottom of the reaction flask and no product weight could be obtained. The product was cold water soluble, nitrogenous in character and extremely hygroscopic.

*Example VIII*

50 grams of dry thin boiling corn starch
22 grams of ethyl urea (contains 20% free urea)
500 ml. of toluene The materials were heated with agitation and slowly distilled until 250 ml. of distillate have been collected. The distillate was very strongly alkaline. The product was filtered on suction, washed with toluene and then with ether and air dried. The air dry weight was 68 grams. This product gave a much softer film than that obtained from the interaction product of urea and starch.

*Example IX*

50 grams of dry rice starch
500 ml. of toluene
30 grams of thiourea

The materials were heated with agitation and slowly distilled until 250 ml. of distillate had been collected. The product was filtered on suction and washed with toluene and then with ether and air dried. Ammonia was evolved in this reaction. Air dry weight was 75 grams (calculated 72 grams). In this reaction the product first agglomerated and then broke up into small granules. It filtered easily.

*Example X*

50 grams of dry amioca starch
500 ml. of toluene
25 ml. of formamide

The materials were distilled with vigorous agitation until 250 ml. of distillate have been collected. The product was filtered on suction, washed with toluene, and then with ether and air dried. Ammonia was evolved in this reaction. Air dry weight 58 grams. Saponification of the product indicated 92% conversion into the monoformate of starch.

*Example XI*

50 grams of thin boiling wheat starch
500 ml. of toluene
50 ml. of tetraethylene pentamine These were mixed together in an open beaker and heated on a steam bath at 100° C. until half the toluene had evaporated. The remaining toluene was decanted from the sirupy product and the product granulated with ether and filtered and air dried. The product weighed 79.5 grams (calculated 83 grams) and was very hygroscopic.

*Example XII*

100 grams air dry corn dextrin (81 grams dry weight)
100 ml. ethylene diamine
500 ml. butanol The materials were heated with agitation and slow distillation until 250 ml. distillate had been collected. The product was filtered on suction, washed with toluene and then with ether and air dried. Ammonia was evolved in this reaction. Air dry weight 111 grams. The product was very alkaline but the alkalinity disappeared on treatment with formaldehyde. It also gave a purple color with iodine. It dispersed in warm water to give a thick gel having good filming properties and giving a very flexible film. Nitrogen content 5.96% (calculated 6.3%).

PRODUCTS

The products of the reactions illustrated in Examples I, II and III (Equations 1, 2 and 3) are pale yellow granular materials. They swell considerably in cold water and disperse in hot water to give viscous sols but are insoluble in other solvents. Aqueous dispersions dry to give brilliantly clear, tough, elastic films. The product of Example I softens indefinitely around 160° C. The product of Example II softens indefinitely around 140° C. The product of Example III softens indefinitely around 120° C.

The products of the reaction illustrated in Example IV (Equation 4) are likewise white to yellowish powders when dry. Many of the products soften at relatively low temperatures and grinding of the product is almost an impossibility. The products are more or less highly hydrated in water. These reaction products are very stable derivatives.

At the completion of the reaction, the products of the reaction illustrated in Example V (Equation 5) are generally highly solvated. They are white to yellowish powders when dry and the dry powders are more or less highly hydrated in water to give a product resembling "alkali starch paste." Generally speaking, these reaction products of the simple primary amines are not particularly stable to exposure to air. They decompose spontaneously in air as follows:

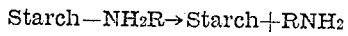
Starch—NH₂R→Starch+RNH₂

The products of the reaction illustrated in Example VI has all of the properties expected of a monoacetate. It is a white granular material, insoluble in cold water but is dispersed in hot water. It is insoluble in other solvents.

POSSIBLE USES

1. Intermediates in organic synthesis.
2. Intermediates in the manufacture of plastics.
3. Sizing materials for natural and synthetic fibers.
4. Thickeners for aqueous dispersions.
5. Emulsifiers, stabilizers, carriers and stiffening agents.
6. Binders and adhesives from aqueous dispersions.
7. Plasticizers for ceramic manufacture.
8. Coating materials where smooth flexible films are required.
9. Filming materials for cold water paints.
10. Ingredients in special dietary foods for ruminants.
11. Absorbent for pyrotechnic compositions.
12. Detergent for special soap compositions.

While the forms of embodiments of the present invention as herein disclosed constitute preferred forms, it is to be understood that other forms might be adopted, all coming within the scope of the claims which follow:

We claim:

1. The method of forming an amino derivative which comprises the step of reacting starch with diethylene triamine at a temperature in the range of from 80° C. to 115° C. in a nonaqueous system wherein there is provided a nonaqueous solvent having a boiling point at atmosperic pressure higher than 80° C.

2. The process of treating starch which comprises the step of mixing starch with an amine at a temperature during the reaction period in aqueous system wherein there is provided a nonaqueous solvent having a boiling point at atmospheric pressure higher than 80° C.

3. The process of forming an amino starch derivative which comprises the step of reacting starch with an amine having at least two amino groups at a temperature in the range of from 80° C. to 115° C. in a nonaqueous system wherein there is provided a nonaqueous solvent having a boiling point at atmospheric pressure higher than 80° C.

4. A process of forming a starch addition product which comprises the step of mixing starch with an amine having only one amino group at a temperature in the range of from 80° C. to 115° C. in a nonaqueous system wherein there is provided a nonaqueous solvent having a boiling point at atmospheric pressure higher than 80° C.

5. The process of forming glucopyranose polymer products which comprises the steps of mixing glucopyranose polymers with an amino compound selected from the class consisting of ethylene diamine, phenyl diamine, propylene diamine, and the polymers of ethlyene which have not more than five free amino groups, and heating to a temperature in the range of from 80° C. to 115° C. in a nonaqueous system wherein there is provided a nonaqueous solvent having a boiling point at atmospheric pressure higher than 80° C.

6. The process of forming glucopyranose polymers which comprises the step of mixing glucopyranose polymers with an amino compound selected from the class consisting of ethylene diamine, phenylene diamine, propylene diamine, and the polymers of ethylene diamine which have not more than five free carbon atoms in a non-aqueous system at a temperature in the range of from 80° C. to 115° C.

7. The process of forming glucopyranose polymer products which comprises the step of mixing glucopyranose polymers with an amino compound selected from the class consisting of ethylene diamine, phenylene diamine, propylene diamine, and the polymers of ethylene diamine which have not more than five free amino groups in a non-aqueous system at a temperature in the range of from 80° C. to 115° C. in substantially stoichiometric quantities so that one amino group of each poly amino molecule may react with a separate unit of the glucopyranose polymers.

8. The process of forming a starch reaction product which consists of the step of mixing an amino compound selected from the class consisting of ethylene diamine, phenylene diamine, propylene diamine, and the polymers of ethylene diamine which have not more than five free amino groups with starch in a nonaqueous system at a temperature of at least 80° C. and not more than 115° C.

9. The process of forming a starch product which comprises the step of mixing starch with ethylene diamine in a nonaqueous system at a temperature of from 80° C. to 115° C. to react the ethylene diamine with starch to form a 2 amino derivative of starch.

10. Uniformly substituted glucopyranose polymer in which the glucose units have a formula of

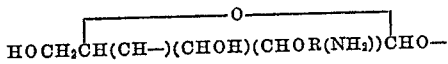

$$\text{HOCH}_2\text{CH(CH-)(CHOH)(CHOR(NH}_2\text{))CHO-}$$

where R is a constituent selected from the class consisting of lower aliphatic radicals having from one to eight carbon atoms, lower aliphatic amino radicals having from one to three amino groups, and phenylene.

11. A uniformly substituted starchate in which each of the glucose units of the substituted starchate has a formula of

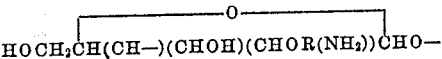

$$\text{HOCH}_2\text{CH(CH-)(CHOH)(CHOR(NH}_2\text{))CHO-}$$

where R is a constituent selected from the group consisting of lower aliphatic radicals having from one to eight carbon atoms, lower aliphatic amino radicals having from one to three amino groups and phenylene.

KENNETH M. GAVER.
ESTHER P. LASURE.
LEVI M. THOMAS.

REFERENCES CITED

The following references are of record in the file of this patent:

UNITED STATES PATENTS

| Number | Name | Date |
|---|---|---|
| 2,097,120 | Fink et al. | Oct. 26, 1937 |
| 2,131,724 | Caeser | Oct. 4, 1938 |
| 2,186,101 | Dreyfus | Jan. 9, 1940 |
| 2,206,354 | Houghton | July 2, 1940 |
| 2,233,475 | Dreyfus | Mar. 4, 1941 |
| 2,235,938 | Lorand | Mar. 25, 1941 |
| 2,389,771 | Gaver | Nov. 27, 1945 |